D. E. SHIPLEY.
AUTOMOBILE TRUCK.
APPLICATION FILED OCT. 14, 1908.

1,023,045.

Patented Apr. 9, 1912.
5 SHEETS—SHEET 1.

Witnesses

Inventor
David E. Shipley
Victor J. Evans
Attorney

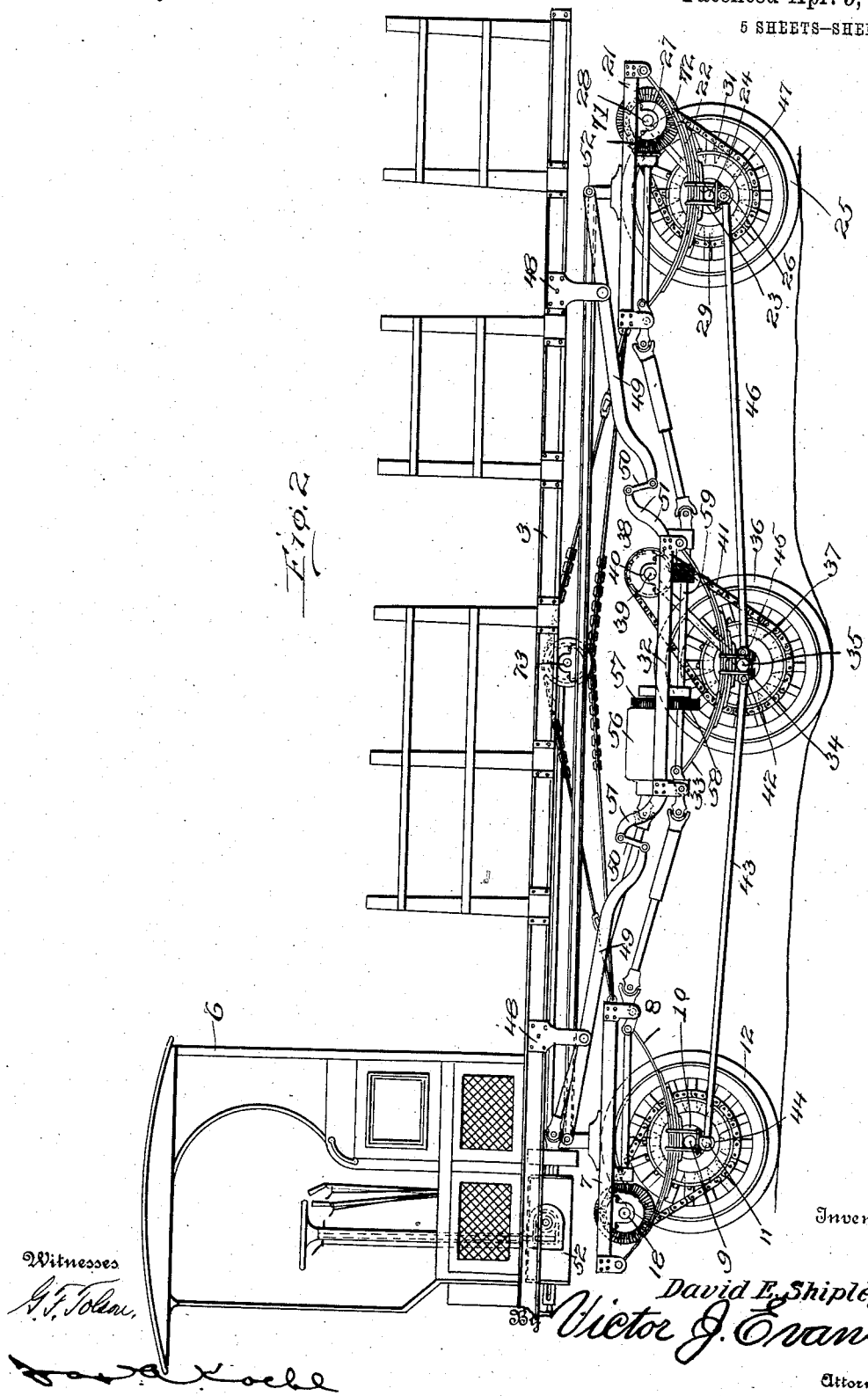

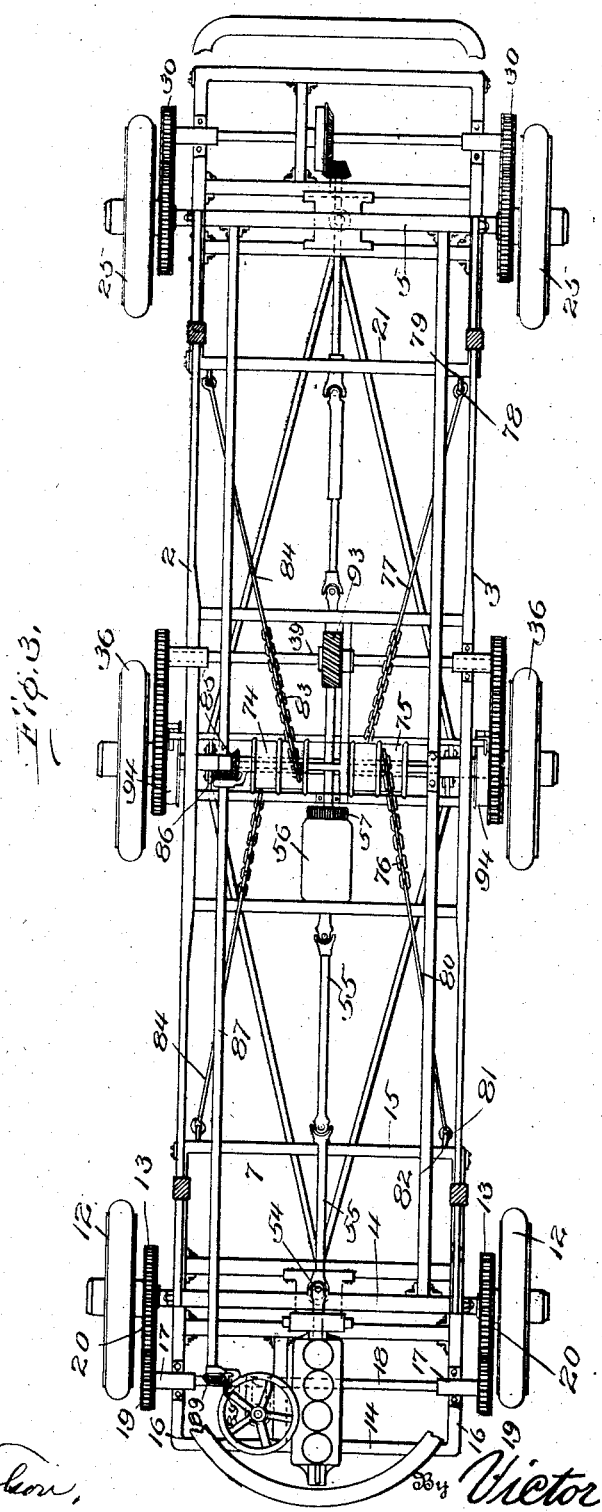

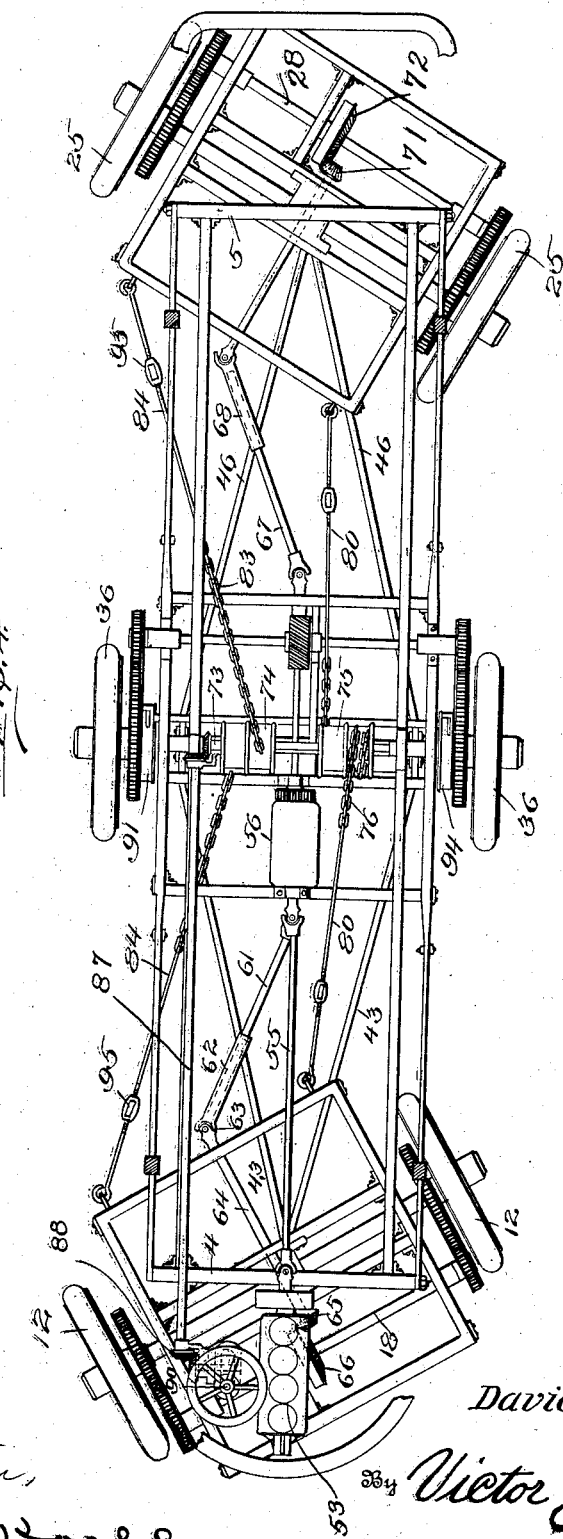

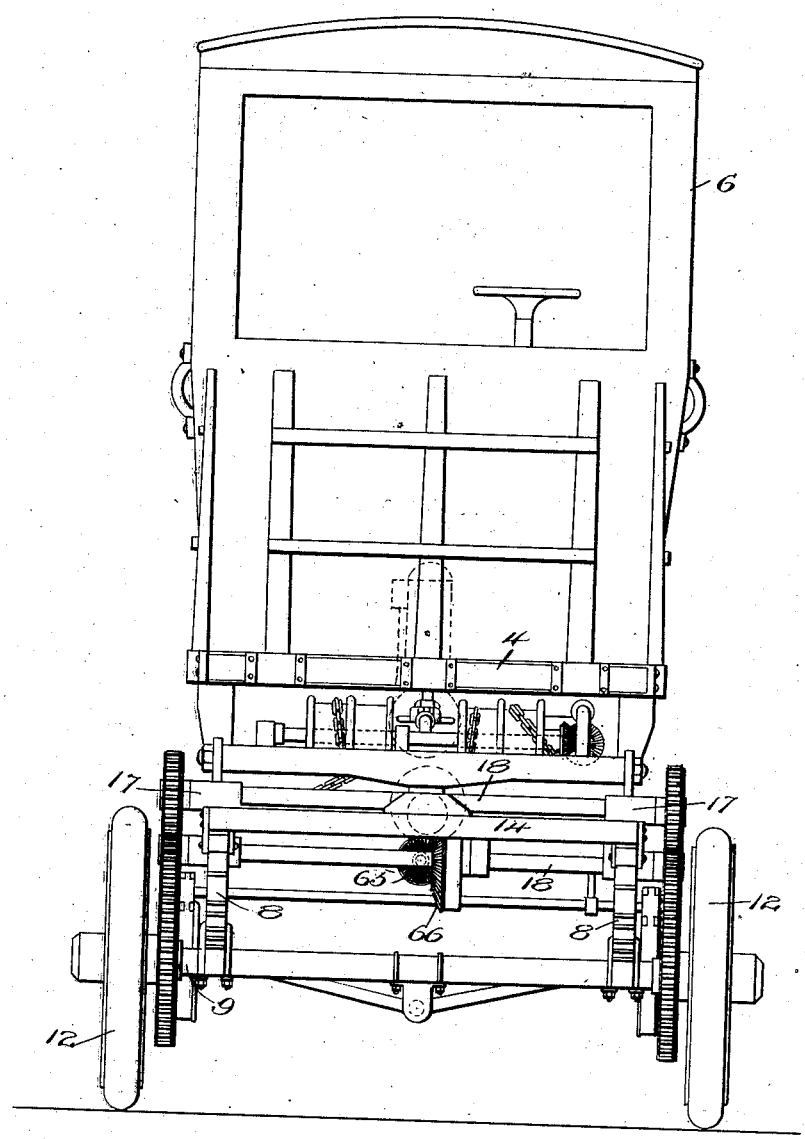

UNITED STATES PATENT OFFICE.

DAVID ELHANNA SHIPLEY, OF JOPLIN, MISSOURI.

AUTOMOBILE-TRUCK.

1,023,045.  Specification of Letters Patent.  Patented Apr. 9, 1912.

Application filed October 14, 1908. Serial No. 457,731.

*To all whom it may concern:*

Be it known that I, DAVID ELHANNA SHIPLEY, a citizen of the United States, residing at Joplin, in the county of Jasper and State of Missouri, have invented new and useful Improvements in Automobile-Trucks, of which the following is a specification.

This invention relates to trucks and more particularly to those for use in connection with automobiles.

Heretofore automobiles and trucks for ordinary vehicles have been provided with four wheels fixed or mounted to the body portion of the vehicle, and from experience, it has been found that upon paved or concrete streets the wheels cut or embed themselves therein incident to the unequal distribution of the weight from the truck and the load carried thereby, and it is therefore an object of this invention to provide a truck having front and rear axles each provided with drive wheels, and an intermediate axle having drive wheels, thus providing six wheels in all so that weight may be equally distributed to all of the said wheels, and to permit the truck to travel with less resistance, thus utilizing less motive power.

A further object is to provide a truck of the character set forth with six independent drive wheels, thus making each of the said wheels a propeller in itself so that frictional engagement of each wheel against the surface greatly increases the power of the vehicle, making it possible for the same to travel effectively up hill, upon rough roads or the like, and further providing means so that in case of breakage of either of the independent drive wheels, the remaining ones may be relied upon to propel the vehicle.

A further object of this invention is to provide simple means for equally distributing to each wheel the same power.

A further object of this invention is to provide a novel form of steering mechanism adapted to control the movement of the front and rear bolster.

Other objects and advantages will be apparent as the nature of the invention is better set forth, and it will be understood that changes within the scope of the claims may be resorted to without departing from the spirit of the invention.

In the drawings, forming a portion of this specification and in which like numerals of reference indicate similar parts in the several views:—Figure 1 is a side view of the truck, Fig. 2 is a side view showing the intermediate wheels lowered, Fig. 3 is a top plan view, Fig. 4 is a top plan view showing the operation of steering mechanism, Fig. 5 is a front end view.

Referring now more particularly to the drawings, there is shown an automobile truck 1 comprising a main frame formed from longitudinally extending parallel spaced beams 2 and 3, and connecting front and rear cross beams 4 and 5. The just described beams may be of the well known T or angle iron form or if found desirable it is obvious that the said beams may be constructed from wood. At the front end, the frame has mounted thereon a cab 6 in which may be seated the operator or driver of the truck.

A front frame 7 is located beneath the truck, and is provided with depending leaf springs 8 of usual construction supported upon an axle 9 by means of clips or the like 10. The clips 10 have depending therefrom socket members 11 for a purpose to be hereinafter more fully described. The axle 9 has loosely mounted thereon at its ends wheels 12 which may be of the ordinary form used upon automobiles or like vehicles, and as shown, each wheel is provided or has fixed thereto upon its hub a sprocket gear 13. The frame 7 is preferably of rectangular form and comprises a front bar 14, a rear bar 15, and side bars 16. The side bars 16 are provided with journal boxes 17 in which a horizontal shaft 18 is revolubly mounted. The shaft 18 has secured thereto at its ends sprocket gears 19 disposed in line with the gears 13 carried by the wheels 12, and the said wheels thus receive endless chain belts 20.

A frame 21 is mounted beneath the truck frame at the rear end thereof and is similar in construction to the previously described frame 7 and is provided with springs 22 engaged by means of clips 23 with a rear axle 24 having loosely mounted thereon at its ends wheels 25 identical to the wheels 12. The clips 23 have depending socket members 26 similar to the socket members 11, and their purpose will presently appear. The frame 21 is provided with journal boxes 27 disposed in alinement with each other so that they support a horizontal shaft 28. The wheels 25 have secured to their hubs sprocket gears 29, and the shaft 28 has secured thereto sprocket gears 30, the said gears 29 and 30 receiving chain belts 31, as clearly shown.

An intermediate frame 32 is mounted beneath the center of the main truck frame, is provided with depending springs 33, and as shown, the said springs are connected by means of clips 34 to an intermediate horizontal axle 35 provided at the ends thereof with loose wheels 36. The wheels 36 have secured thereto sprocket gears 37 disposed in line with similar sprocket gears 38 upon a shaft 39. The shaft 39 is journaled upon the frame 32 in bearings 40. The sprocket gears 37 and 38 just mentioned thus receive endless chain belts 41. The clips 34 are provided with forwardly extending ears 42 which have pivotally mounted thereto the rear ends of stay rods 43, the said rods having spherical heads 44 at their front ends seated in the socket members 11. The clips 34 are also provided with rearwardly extending ears 45 which have pivotally secured thereto the front ends of stay rods 46, the rear ends of the said rods being provided with spherical heads 47 seated in the socket members 26. By the provision of the stay rods it will be seen that they are universally connected to the front, rear and intermediate axles 9, 24 and 35.

The beams 3 are provided adjacent to their front and rear ends with depending brackets 48 which have pivotally mounted thereto equalizing bars 49. The bars 49 are provided at their inner ends with pivoted links 50 which links are also pivotally connected to brackets 51 upon their frame 32. The outer ends of the equalizing bars are pivotally mounted as shown at 52 to the front and rear frames 7 and 21.

The construction just described is such that the front, rear and intermediate axles are pivotally mounted beneath the truck frame and the axles are thus adapted for movement in a vertical plane.

Beneath the front end of the truck frame is mounted a motor 53 which may be of a construction best required for the purpose, but which is connected by means of a universal joint 54 to universally connected drive shaft sections 55. The innermost shaft is connected and adapted to operate a transmission gear diagrammatically shown at 56. The said transmission gearing, it may be stated, is provided with a gear 57 in mesh with a gear 58 upon a shaft 59 mounted beneath the frame 32. The shaft 59 is universally connected as shown at 60 to a shaft section 61 slidably mounted in a tubular shaft section 62. The section 62, at the rear end thereof, is universally connected as shown at 63 to a shaft section 64 mounted in suitable bearing boxes beneath the frame 7, and at the front end, the shaft section 64 has secured thereto a bevel pinion 65 in mesh with a bevel pinion 66 upon the shaft 18. By provision of the telescopic sections 61 and 62 it will be seen that they may be moved toward or away from each other as the frame 7 is moved angularly in a horizontal plane. The shaft 59, at the rear end thereof, is universally connected as shown at 65 to a shaft section 67 identical to the section 61, and the said section is slidable in a tubular section 68, and this section is universally connected as shown at 69 to a shaft 70 beneath the frame 21. The shaft 70 is provided at its rear end with a bevel pinion 71 in mesh with a pinion 72 upon the shaft 28. When the motor 53 is in operation it is obvious that power is equally distributed to each of the wheels 12, 25 and 36.

A shaft 73 is mounted beneath the truck frame and is provided with drums 74 and 75. The drum 75 has wound thereon a chain or similar flexible element 76. At one end the said chain carries a rod 77 having an eye member at its rear end as shown at 78 to engage an eye bolt or the like 79 carried by the frame 21 adjacent to one side and at the front end thereof. The other end of the chain 76 carries a rod 80 having an eye 81 at its forward end connected at 82 to the frame 7. As shown the connections for the rods 77 and 80 which are carried by the frames 7 and 21 are disposed in alinement with each other. The drum 74 is provided with a cable or flexible element 83 wound upon the said drum in an opposite direction to the cable upon the drum 75. As shown the ends of the said cable 83 are provided with rods 84 loosely connected at their outer ends to the frames 7 and 21. The shaft 73 is provided at one end with a bevel pinion 85 in mesh with a similar pinion 86 upon a shaft 87 beneath the truck frame, and at the front end the shaft 87 is provided with a bevel pinion 88 in mesh with a pinion 89. The pinion 89 is adapted to be operated by a vertical shaft 90 having secured thereto at its upper end a steering wheel 91. The steering wheel 91 is located within the cab 6 and is disposed within convenient reach of the operator or driver of the truck.

From the construction herein set forth and described it will be seen that each wheel of the truck is a drive, and that equal power is transmitted to each wheel making the machine extremely effective in hill climbing, or in traveling upon rough roads or the like.

From the foregoing description it will be understood that the weight of the truck is equally distributed to all the wheels through the medium of the equalizing bars 49. By the provision of the sectional shafts for operating the shafts 18, 28 and 39 it is obvious that the said sections are capable of moving or bending when the front and rear axles are moved angularly. It will be understood that the axles 9, 24 and 35 are yieldingly supported beneath the frames 7, 21 and 32, and that the frames are connected to each other in such manner that they may move in a vertical plane.

Upon reference to Fig. 2 of the drawings it will appear that the intermediate frame 32 of the truck is lowered and that the axle 35 of the said frame is lower than the axles 9 and 24. In this incidence it is obvious that the truck frame remains in a parallel position with respect to the surface or ground upon which it travels and should the wheels come in contact with an obstruction, or should they roll into a ditch it will be seen that equal weight is distributed to the axles as described. It may be mentioned that the shaft 59 is provided with a worm gear 92 which is in mesh with a worm gear 93 upon the shaft 39.

A brake mechanism is indicated diagrammatically at 94 in Fig. 4 of the drawings, and it will be understood that any suitable or well known controlling means may be provided for the said mechanism and that the said mechanism may be of any well known type.

The rods 80 and 84 carried by the chains 76 and 83 are preferably made in sections, and the said sections are connected to each other preferably by means of turn-buckles 95 in order that the said rods may be lengthened or shortened to meet different occasions.

Should one or more of the wheels for the truck become inoperative it is obvious that the remaining wheels which, as heretofore mentioned, are independent drive wheels will effectively serve to propel the vehicle.

Having thus described the invention what is claimed as new, is:—

1. In a truck of the character described, a main frame, end frames located beneath the main frame for vertical and swinging movement, an intermediate frame connected with said end frames for vertical movement, movable supporting means connecting the main frame with the end frames and with the intermediate frame, driven wheeled axles supported by the end frames and by the intermediate frame, a plurality of drums mounted upon said main frame intermediate the ends thereof and in alinement with said intermediate frame, flexible connections between said drums and said end frames, said connections being wound in relatively opposite directions on the drums, and means for operating the drums to swing said end frames in opposite directions independently of the vertical movement of the frames whereby to steer the truck.

2. In a truck of the character described, a main frame, end frames located beneath the main frame for vertical and swinging movement, an intermediate frame connected with the said end frames for vertical movement, brackets depending from said main frame, equalizing bars mounted in said brackets for pivotal movement, said bars connecting the main frame with the end frames and intermediate frames and interconnecting said intermediate and end frames and permitting vertical movement of the said intermediate and end frames relative to the main frame, driven wheeled axles supported by the end frames and the intermediate frames, a plurality of drums mounted upon said main frame intermediate the ends thereof and in alinement with said intermediate frame, flexible connections between said drums and said end frames, said connections being wound in relatively opposite directions on the drums, and means for operating the drums to swing said end frames in opposite directions independently of the vertical movement of the end frames and intermediate frame whereby to steer the truck.

In testimony whereof I affix my signature in presence of two witnesses.

DAVID ELHANNA SHIPLEY.

Witnesses:
 HORACE MERRITT,
 CHAS. A. CRAVENS.